W. G. WOOD.
PNEUMATIC SHOCK ABSORBER.
APPLICATION FILED NOV. 25, 1914.
1,161,102. Patented Nov. 23, 1915.
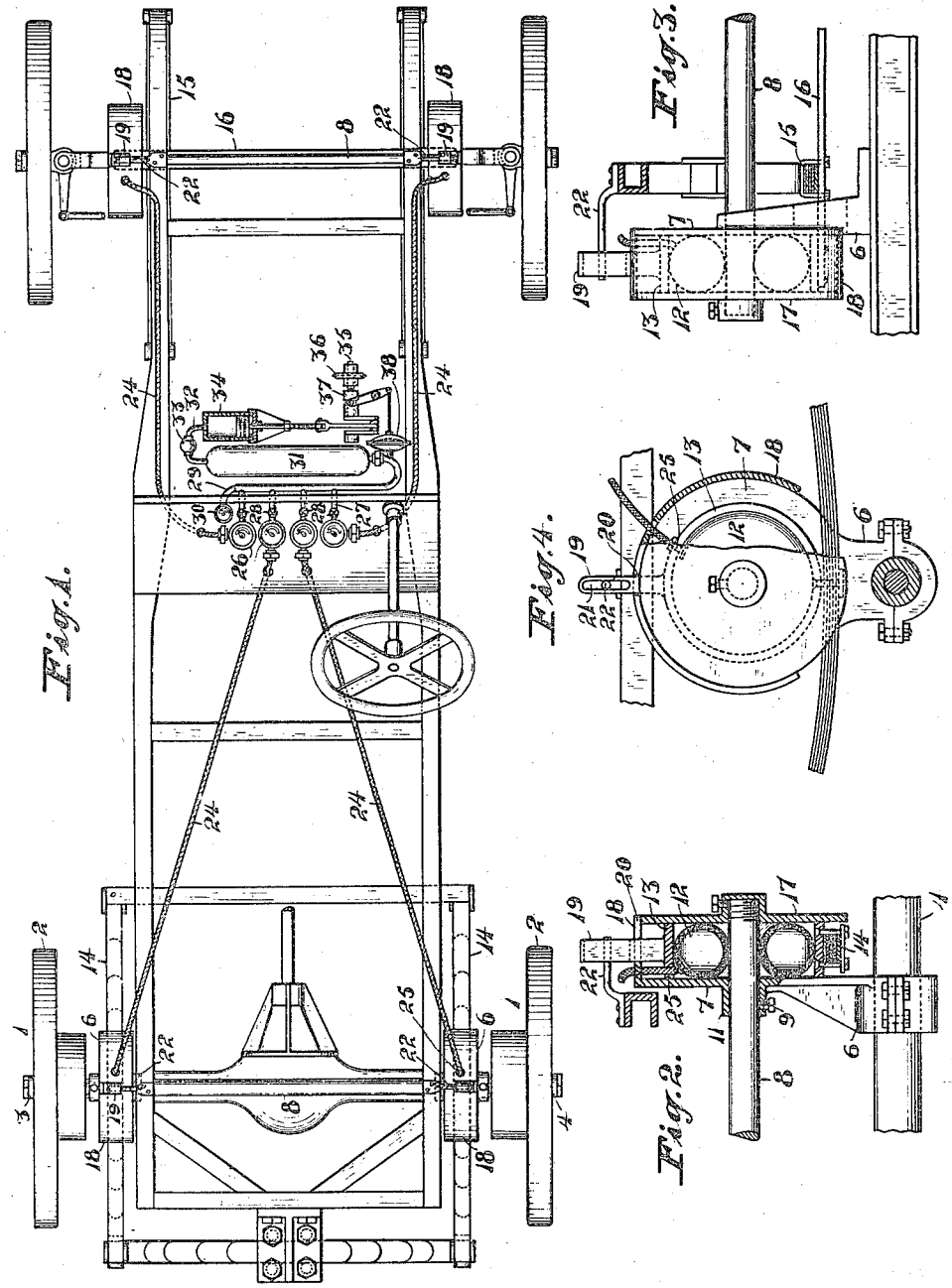
WITNESSES:
F. C. Fliedner
G. M. Ball
INVENTOR.
William G. Wood
BY Francis M. Wright,
ATTORNEY

UNITED STATES PATENT OFFICE.

WILLIAM G. WOOD, OF SACRAMENTO, CALIFORNIA.

PNEUMATIC SHOCK-ABSORBER.

1,161,102.  Specification of Letters Patent.  Patented Nov. 23, 1915.

Application filed November 25, 1914. Serial No. 873,955.

*To all whom it may concern:*

Be it known that I, WILLIAM G. WOOD, a citizen of the United States, residing at Sacramento, in the county of Sacramento and State of California, have invented new and useful Improvements in Pneumatic Shock-Absorbers, of which the following is a specification.

This invention relates to shock absorbers for vehicles, and is an improvement on an invention for which I have, on the 28th day of November, 1913, filed an application, Serial No. 803,369, for Letters Patent of the United States. In said application I disclose resilient means for supporting a vehicle body upon wheels comprising, at each side of the vehicle, a ring, supporting the vehicle body, a bar passing through the ring, an annular pneumatic tube within the ring and around the bar and coaxial therewith, and plates secured to the bar on opposite sides of the ring and in slidable contact therewith.

The object of the present invention is to provide in connection with said resilient means a shock absorber which will resiliently limit the vertical movement of the vehicle body, and also prevent the breakage of the vehicle springs which is apt to occur, especially in the upward movement of said body, without such limiting means.

In the accompanying drawing, Figure 1 is a plan view of the vehicle; Fig. 2 is a transverse section through one of the rear pneumatic tubes; Fig. 3 is a similar view through a front tube; Fig. 4 is a detail broken side view of one of said tubes and the parts immediately connected therewith.

Referring to the drawing, 1 indicates the driving wheels of an automobile having, instead of the usual pneumatic tires, any ordinary tires 2, such as of solid rubber. On the axles 3, 4, of said wheels are secured standards 6, enlarged at their upper portions to form circular plates 7, having central apertures through which pass transverse bars 8, secured to said plates by means of set screws 9 screwed through hub-like extensions 11 of said plates. Around the terminal portions of said bars, extending beyond said plates, are flexible pneumatic tubes 12, and surrounding said tubes are rings 13, which support bow springs 14, 15, which in turn resiliently support the body of the vehicle. The springs 14 at the rear end of the vehicle are directly connected to the lower portions of the rings, while those 15 at the front end are connected to a transverse bar 16, the ends of which are themselves connected to the lower portions of the rings. Secured upon the ends of the bars 8 are circular plates 17, which fit snugly against the outer edges of the rings 13, the inner edges of said rings 13 fitting snugly against the outer surfaces of the plates 7. Said plates 7 have cylindrical members 18 formed integral therewith, the rear members, however, not extending entirely around the rings, but being cut away at their lower portions. On the upper portions of said rings 13 are formed integral therewith slotted guides 19 which pass through slots 20 in the upper portions of the cylindrical members 18, and through the slots 21 of said guides extend fingers 22, secured to the frame of the vehicle. I thus utilize the pneumatic tubes 12 as a resilient means for limiting the vertical movement of the vehicle body, for, when the vehicle body rebounds upwardly, for instance, so that the fingers 22 secured to said vehicle body arrive at the top of the slots 21, then no further strain is put upon the springs 14; and the vehicle body, the rings 13 and the springs 14 move upwardly as if one solid piece, said upward movement being resiliently resisted by the pneumatic tubes 12. Thus the danger of breaking the springs 14, especially the uppermost spring, is entirely avoided. A similar action takes place on the downward movement of the vehicle body. Said pneumatic tubes are supplied with compressed air by means of tubes 24 which pass through holes 25 in said rings 13 and are connected at their other ends with gages 26 in the dash-board of the vehicle, said gages being connected with pipes 27, having therein three-way valves 28, connected to a common pipe 29 connected with a gage 30 and with an air tank 31, which is also connected by a pipe 32, having therein a non-return valve 33, with an air compressor 34 actuated from a shaft 35, adapted to be driven by a sprocket wheel 36, loose thereon but adapted to be operatively connected thereto by a clutch 37 controlled by an automatic cut-out 38 which operates to start the pump when the pressure is reduced to a fixed point and to stop it when the pressure rises to another fixed point. Said sprocket wheel is connected to any suitable motor mechanism, preferably to the shaft of the engine of the automobile. In case the device is applied to a self-propelled vehicle, the particular manner in which the compressed air tank is charged forms, however, no part of my present invention. If desired, the air tank may be charged by means of stationary mechanism.

By means of this construction the driver of the vehicle can vary the pressure of the air in the several pneumatic tubes according to road conditions and also to correspond with the weight imposed upon the part of the vehicle adjacent to each tube, and at the same time he is apprised should there be any leakage in any of the tubes and can immediately, without stopping or slowing down, or leaving the seat of the vehicle, adjust the proper valve to supply compressed air to compensate for the leakage.

I claim:—

Resilient means for supporting a vehicle body upon wheels comprising, at each side of the vehicle, a ring, and a bar passing through the ring, one of said elements being supported by the wheels and the other supporting the vehicle body, an annular pneumatic tube within the ring and around the bar and coaxial therewith, plates secured to the bar on opposite sides of the ring, and in slidable contact therewith, and devices, of which one is connected with the vehicle body and the other with the element supporting the vehicle body, and loosely engaging each other to have a limited vertical movement relative to each other.

In testimony whereof I have hereunto set my hand in the presence of two subscribing witnesses.

WILLIAM G. WOOD.

Witnesses:
J. E. HUNTOON,
A. G. FOLGER.